(12) United States Patent
Basu et al.

(10) Patent No.: US 6,307,911 B1
(45) Date of Patent: Oct. 23, 2001

(54) FAST HIERARCHICAL BACKPROJECTION FOR 3D RADON TRANSFORM

(75) Inventors: Samit Basu; Yoram Bresler, both of Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/539,074

(22) Filed: Mar. 30, 2000

Related U.S. Application Data

(63) Continuation-in-part of application No. 09/418,933, filed on Oct. 15, 1999, which is a continuation-in-part of application No. 09/338,677, filed on Jun. 23, 1999, and a continuation-in-part of application No. 09/419,415, filed on Oct. 15, 1999, which is a continuation-in-part of application No. 09/338,092, filed on Jun. 23, 1999.

(51) Int. Cl.[7] .................................................. A61B 6/03
(52) U.S. Cl. ............................... 378/15; 378/4; 378/901
(58) Field of Search ............................. 378/4, 8, 15, 901

(56) References Cited

U.S. PATENT DOCUMENTS

| | | | |
|---|---|---|---|
| 4,042,811 | 8/1977 | Brunnett et al. | 235/151.3 |
| 4,149,247 | 4/1979 | Pavkovich et al. | 364/414 |
| 4,217,641 | 8/1980 | Naparstek | 364/414 |
| 4,491,932 | 1/1985 | Ruhman et al. | 364/900 |
| 4,616,318 | 10/1986 | Crawford | 364/414 |
| 4,626,991 | 12/1986 | Crawford et al. | 364/414 |
| 4,709,333 | 11/1987 | Crawford | 364/414 |
| 4,714,997 | 12/1987 | Crawford et al. | 364/414 |
| 4,858,128 | 8/1989 | Nowak | 364/413.13 |
| 4,930,076 | 5/1990 | Meckley | 364/413.21 |
| 4,991,093 | 2/1991 | Roberge et al. | 364/413.15 |
| 5,008,822 | 4/1991 | Brunnett et al. | 364/413.21 |
| 5,136,660 | 8/1992 | Flickner et al. | 382/46 |
| 5,224,037 | 6/1993 | Jones et al. | 364/413.19 |
| 5,229,934 | 7/1993 | Mattson et al. | 364/413.21 |
| 5,243,664 | 9/1993 | Tuy | 382/6 |
| 5,300,782 | 4/1994 | Johnston et al. | 250/363.03 |
| 5,375,156 | 12/1994 | Kuo-Petravic et al. | 378/9 |
| 5,396,528 | 3/1995 | Hu et al. | 378/14 |
| 5,438,602 | 8/1995 | Crawford et al. | 378/4 |
| 5,552,605 | 9/1996 | Arata | 250/363.04 |
| 5,559,335 | 9/1996 | Zeng et al. | 250/363.04 |

(List continued on next page.)

FOREIGN PATENT DOCUMENTS 611181   8/1994   (EP) .

OTHER PUBLICATIONS

Martin L. Brady; "A Fast Discrete Approximation Algorithm for the Radon Transform"; *SIAM J. Comput.* vol. 27, No. 1, pp. 107–119; Feb. 1998.

(List continued on next page.)

*Primary Examiner*—David V. Bruce
(74) *Attorney, Agent, or Firm*—Greer, Burns & Crain, Ltd.

(57) ABSTRACT

Data representing a three-dimensional (3D) sinogram (array of numbers) is backprojected to reconstruct a 3D volume. The transformation requires $N^3 \log_2 N$ operations. An input sinogram is subdivided into a plurality of subsinograms using either an exact or approximate decomposition algorithm. The subsinograms are repeatedly subdivided until they represent volumes as small as one voxel. The smallest subsinograms are backprojected using the direct approach to form a plurality of subvolumes, and the subvolumes are aggregated to form a final volume. Two subdivision algorithms are used. The first is an exact decomposition algorithm, which is accurate, but slow. The second is an approximate decomposition algorithm which is less accurate, but fast. By using both subdivision algorithms appropriately, high quality backprojections are computed significantly faster than existing techniques.

23 Claims, 2 Drawing Sheets

U.S. PATENT DOCUMENTS

| | | | |
|---|---|---|---|
| 5,579,358 | 11/1996 | Lin | 378/4 |
| 5,625,190 | 4/1997 | Crandall | 250/363.03 |
| 5,654,820 | 8/1997 | Lu et al. | 359/298 |
| 5,727,041 | 3/1998 | Hsieh | 378/4 |
| 5,778,038 | 7/1998 | Brandt et al. | 378/4 |
| 5,796,803 | 8/1998 | Flohr et al. | 378/15 |
| 5,805,098 | 9/1998 | McCorkle | 342/25 |
| 5,848,114 | 12/1998 | Kawai et al. | 378/4 |
| 5,862,198 | 1/1999 | Samarasekera et al. | 378/4 |
| 5,901,196 | 5/1999 | Sauer et al. | 378/4 |
| 6,028,907 | 2/2000 | Adler et al. | 378/4 |
| 6,108,007 | 8/2000 | Shochet | 345/430 |

OTHER PUBLICATIONS

A. Brandt et al.; "Fast Calculation of Multiple Line Integrals"; *SIAM J. Sci. Comput.*, vol. 20, No. 4, pp. 1517–1429; 1999.

Achi Brandt et al.; :A Fast and Accurate Multilevel Inversion of the Radon Transform; *SIAM J. Appl. Math.*, vol. 60, No. 2, pp. 437–462; 1999.

Carl R. Crawford; "Reprojection Using a Parallel Backprojector"; Elscint Ltd., P.O. Box 5258, Haifa, Israel; Mar. 12, 1986.

Carl R. Crawford et al.; "High Speed Reprojection and its Applications"; *SPIE vol. 914 Medical Imaging II*; 1988.

Per–Erik Danielsson et al.; Backprojection in $O(N^2 \log t N)$ Time; IEEE Medial Imaging Conference, Albuquerque, NM; Nov. 12–15, 1997.

Alexander H. Delaney; "A Fast and Accurate Fourier Algorithm for Iterative Parallel–Beam Tomography"; *IEEE Transactions on Image Processing*, vol. 5, No. 5, pp. 740–753; May 1996.

E.C. Frey et al.; "A Fast Projector–Backprojector Pair Modeling the Asymmetric, Spatially Varying Scatter Response Function for Scatter Compensation in SPECT Imaging"; *IEEE Transactions on Nuclear Science*, vol. 40, No. 4, pp. 1192–1197; Aug. 1993.

Sung–Cheng Huang et al.; "Capability Evaluation of a Sinogram Error Detection and Correction Method in Computed Tomography"; *IEEE Transactions on Nuclear Science*, vol. 39, No. 4, pp. 1106–1110; 1992.

Eric Michielssen; "A Multilevel Matrix Decomposition Algorithm for Analyzing Scattering from Large Structures"; *IEEE Transactions on Antennas and Propagation*, vol. 44, No. 8, pp. 1086–1093; Aug. 1996.

John M. Ollinger; "Iterative Reconstruction–Reprojection and the Expectation–Maximization Algorithm"; *IEEE Transactions on Medical Imaging*, vol. 9, No. 1, pp. 94–98; Mar. 1990.

John M. Ollinger; "Reconstruction–Reprojection Processing of Transmission Scans and the Variance of PET Images"; *IEEE Transactions on Nuclear Science*, vol. 39, No. 4, pp. 1122–1125; 1992.

T.M. Peters; "Algorithms for Fast Back–and–Re–Projection in Computed Tomography"; *IEEE Transactions on Nuclear Science*, voll NS–28, No. 4, pp. 3641–3646; Aug. 1981.

Jorge L.C. Sanz; "Computing Projections of Digital Images in Image Processing Pipeline Architectures"; *IEEE Transactions on Acoustics, Speech and Signal Processing*, vol. ASSP–35, No. 2, pp. 198–207; Feb. 1987.

Herman Schomberg et al.; "The Gridding Method for Image Reconstruction by Fourier Transformation"; *IEEE Transactions on Medical Imaging*, vol. 14, No. 3, pp. 596–607; Sep. 1995.

Dan–Chu Yu et al.; "Study of Reprojection Methods in Terms of Their Resolution Loss and Sampling Errors"; *IEEE Transactions on Nuclear Science*, vol. 40, No. 4, pp. 1174–1178; Aug. 1993.

G.L. Zeng; "A Rotating and Warping Projector/Backprojector for Fan–Beam and Cone–Beam Iterative Algorithm"; *IEEE Transactions on Nuclear Science*, vol. 41, No. 6, pp. 2807–2811; Dec. 1994.

Gary H. Glover et al.; "An Algorithm for the Reduction of Metal Clip Artifacts in CT Reconstructions"; *Medical Physics*, vol. 8, No. 6, pp. 799–807; Nov./Dec. 1981.

Cobb et al; "Real–time Image Formation Effort Using Quadtree Backprojection and Reconfigurable Processing"; *Third Annual Federated Laboratory Symposium on Advanced Sensors*; pp. 133–137; Feb. 2–4, 1999.

Oh et al.; "Multi–resolution Mixed–radix Quadtree SAR Image Focusing Algorithms"; Third Annual Federated Laboratory Symposium on Advanced Sensors; pp. 139–143; Feb. 2–4, 1999.

Marr et al; "On two approaches to 3D reconstruction in NMR Zeumatography"; *Mathematical Aspects of Computerized Tomography Proceedings*, Oberwolfach, pp 225–240; Feb. 10–16, 1980.

Axelsson et al.; Three–dimensional reconstruction from cone–beam data in $O(N^3 \log N)$ time; *Phys. Med. Biol. 39*, pp 477–491; 1994.

Clack et al.; "Cone–beam reconstruction by the use of Radon transform intermediate functions"; *Journal of the Optical Society of America A*/vol. 11, No. 2, pp 580–585; Feb. 1994.

Nicolas J. Dusaussoy; VOIR: A Volumetric Image Reconstruction Algorithm Based on Fourier Techniques for Inversion of the 3–D Radon Transform; *IEEE Transactions on Image Processing*, vol. 5, No. 1, pp 121–131; Jan. 1996.

V. P. Palamadov; Localization of Harmonic Decomposition of the Radon Transform; *Inverse problems 11*; pp 1025–1030; 1995.

Smith et al.; Implementations, Comparisons, and an Investigation of Heuristic Techniques for Cone–Beam Tomography; *IEEE Transactions on Medical Imaging*, vol. 15, No. 4, pp 519–531; Aug. 1996.

Grangeat et al.; Indirect Cone–Beam Three–Dimensional Reconstrcution; *Contemporary Perspectives in Three–Dimensional Biomedical Imaging*, pp 29–51; 1997.

Maria Magnusson Seger; Three–dimensional reconstruction from cone–beam data using an efficient Fourier technique combined with a special interpolation filter; *Phys. Med. Biol. 43*, pp 951–959; Jul. 31, 1997.

Xiaochuan Pan; Quasi–Bandlimited Properties of Radon Transforms and Their Implications for Increasing Angular Sampling Densities; *IEEE Transactions on Medical Imaging*, vol. 17, No. 3, pp 395–406; Jun. 1998.

Stephan Nilsson; Fast Backprojection; Dept. Of Electrical Eng., Linkopings universitet, Sweden, pp 1–8; Jul. 4, 1996.

Per–Erik Danielsson; Iterative Techniques for Projection and Back–Projection; Dept. Of Electrical Eng. Linkopings universitet, Sweden pp 1–28, Jun. 10, 1997.

Stephan Nilsson; Application of fastbackprojection techniques for some inverse problems of integral geometry; Dept. Of Mathematics., Linkopings universitet, Sweden, pp 1–99; Jun. 19, 1997.

FAST HIERARCHICAL BACKPROJECTION FOR 3D RADON TRANSFORM

This is a continuation-in-part of Ser. No. 09/418,933, filed Oct. 15, 1999, which is a continuation-in-part of abandoned Ser. No. 09/338,677, filed Jun. 23, 1999. This is also a continuation-in-part of Ser. No. 09/419,415, filed Oct. 15, 1999, which is a continuation-in-part of abandoned Ser. No. 09/338,092, filed Jun. 23, 1999. All of the parent applications are incorporated by reference in their entirety.

FIELD OF THE INVENTION

The present invention generally concerns imaging. More specifically, the present invention concerns a method of reconstructing three-dimensional tomographic volumes from projections.

BACKGROUND OF THE INVENTION

Tomographic volumes are created from line integral measurements of an unknown object at a variety of orientations. These line integral measurements, which may represent measurements of density, reflectivity, etc., are then processed to yield a volume that represents the unknown object. Data generated in this manner is collected into a sinogram, and the sinogram is processed and backprojected to create two-dimensional images or three-dimensional volumes.

The process of backprojection of three-dimensional (3D) Radon transform data is a key step in the reconstruction of volumes from tomographic data. The 3D Radon transform underlies a number of existing and emerging technologies, such as Synthetic Aperture Radar (SAR), volumetric Magnetic Resonance Imaging (MRI), cone-beam X-ray tomography, etc. The backprojection step is intensive from a computation standpoint, and slow. Thus, there is a need for methods for backprojecting 3D Radon data which are less costly and less time consuming.

Accordingly, one object of this invention is to provide new and improved imaging methods.

Another object is to provide new and improved methods for backprojecting 3D volume data.

Still another object is to provide new and improved methods for backprojecting 3D volume data which are less costly in terms of hardware and computational expense, and faster than known methods.

SUMMARY OF THE INVENTION

Data representing a 3D sinogram (array of numbers) is backprojected to reconstruct a 3D volume. The transformation requires $N^3 \log_2 N$ operations.

An input sinogram is subdivided into a plurality of subsinograms using decomposition algorithms. The subsinograms are repeatedly subdivided until they represent volumes as small as one voxel. The smallest subsinograms are backprojected using the direct approach to form a plurality of subvolumes, and the subvolumes are aggregated to form a final volume.

Two subdivision algorithms are used. The first is an exact decomposition algorithm, which is accurate, but slow. The second is an approximate decomposition algorithm which is less accurate, but fast. By using both subdivision algorithms appropriately, high quality backprojections are computed significantly faster than existing techniques.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
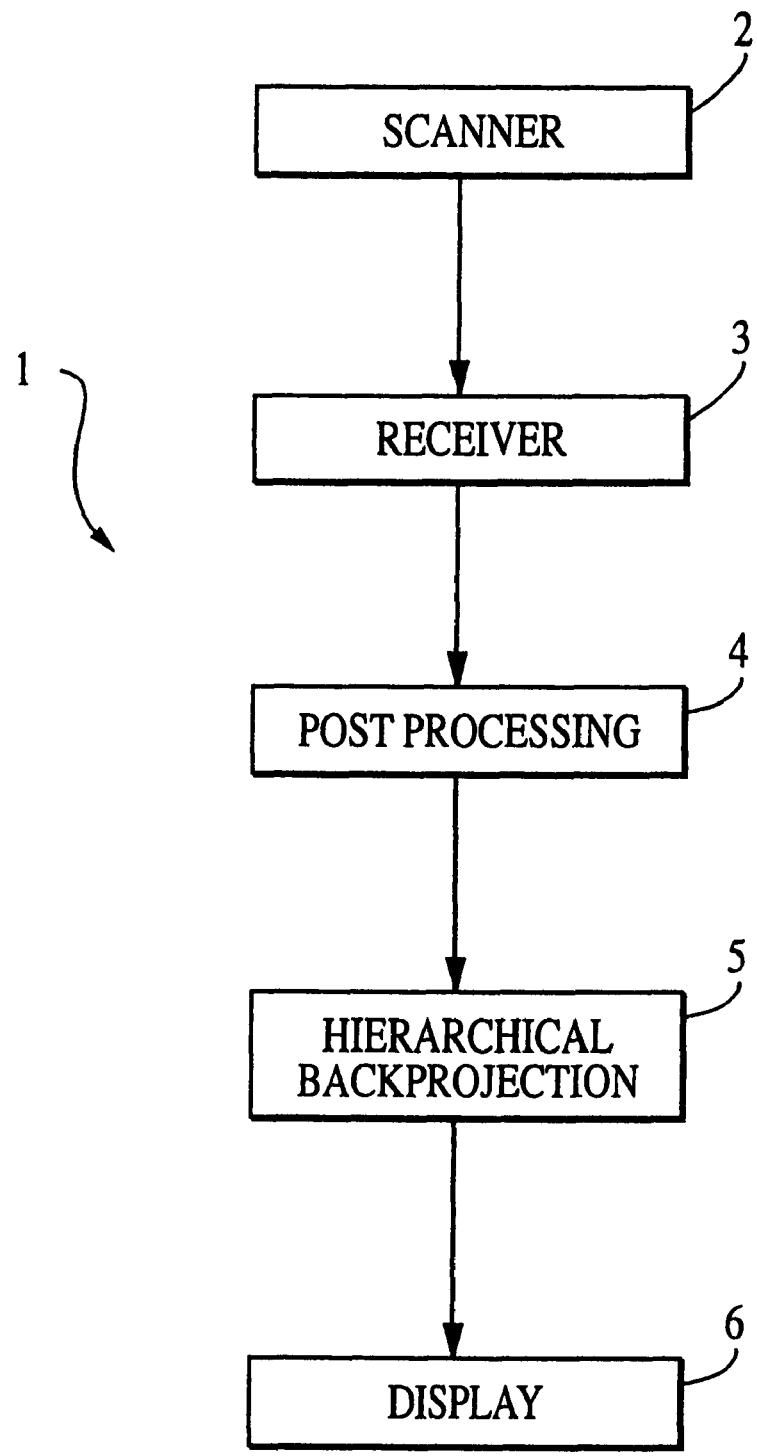
FIG. 1 is a block diagram of apparatus for use with the present invention.

The present invention has application in a variety of imaging apparatus, including CT scanners. Typical imaging apparatus 1 (FIG. 1) includes a scanner 2 which acquires data from an object such as a head, and sends raw data to a receiver 3. The data is processed in a post-processor 4, which can include re-binning, filtering, or other processes. The post-processor 4 generates a sinogram which is backprojected in a Hierarchical BackProjection (HBP) apparatus 5. The HBP 5 produces an image which is shown on a display 6 or other suitable output device.

Figure 2:
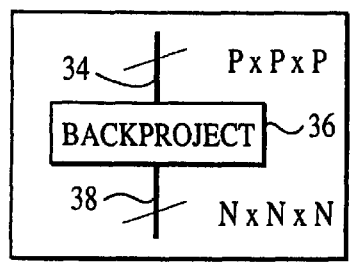
FIG. 2 is a diagram of a known decomposition method.

Known backprojection is described by FIG. 2, in which an input 34 is a sinogram (3D array of numbers) mapped through backprojection 36 to a volume (3D array of numbers) 38. The straightforward approach to this transformation required $N^5$ operations, where N characterizes the linear size of both the input and output.

The process of this invention is a fast method for performing this transformation which requires $N^3 \log_2 N$ operations under the same circumstances. In the present invention, the input sinogram is subdivided into a plurality of subsinograms using decomposition algorithms. The subsinograms are repeatedly subdivided until they represent volumes as small as one voxel. Then, the smallest subsinograms are backprojected using the direct approach to form a plurality of subvolumes. The subvolumes are aggregated to form a final volume.

Backprojection is accomplished using two subdivision algorithms. One algorithm is an exact algorithm, which is accurate, but slow, and the other algorithm is an approximate algorithm which is less accurate, but fast. Both algorithms are based on a 3D Radon transform.

The 3D Radon transform for a spatial density h(x), is given by $$q(r, \omega) = \int_{x \cdot \omega = r} h(x) dx, \tag{1}$$

where $\omega$ is a point on the unit 3D sphere. The sinogram g(m, n, k) is indexed by three integers, the first two representing the angular coordinates, and the third representing samples in the radial coordinate. For example, $g(m, n, k) = q(\omega_{m,n}, kT)$, where T is the radial sampling period, and $\omega_{m,n}$ with m, n $\in \{1, \ldots, P\}$ are the $P^2$ orientations at which the 3D Radon transform is sampled.

The backprojection operation is computed by first radially interpolating the backprojected data:

$$g_c(m, n, s) = \sum_k g(m, n, k) \phi\{s - (k + \tau_{m,n})T\} \tag{2}$$

where $\phi$ is the radial interpolation kernel, T is the radial sampling period, m, n $\in \{0, \ldots, P-1\}$, and $\tau_{m,n} \in [-0.5,$ 0.5]. Next, this is backprojected using the following direct formula:

$$f_c(x) = \sum_m \sum_n g_c(m, n, x \cdot \omega_{m,n}). \quad (3)$$

This continuous reconstruction is then smoothed and resampled $$f(i) = \int b(x-i) f_c(x) dx \quad (4)$$

where b is a smoothing function, such as a cube-shaped or spherical voxel, or some smoother such function. Combining formulas (2), (3) and (4) yields the following discretized backprojection:

$$f(i) = \sum_k \sum_m \sum_n g(m, n, k) \int b(x-i) \phi\{x \cdot \omega_{m,n} - (k + \tau_{m,n})T\} dx. \quad (5)$$

This can be rewritten as $$f(i) = \sum_k \sum_m \sum_n g(m, n, k) \rho\{i \cdot \omega_{m,n} - (k + \tau_{m,n})T\}, \quad (6)$$

with $$\rho(t, m, n) = \int b(x) \phi(x \cdot \omega_{m,n} + t) dx. \quad (7)$$

We denote the backprojection operation that maps a sinogramn {g(m,n,k)} with P×P angular samples and O(N) radial samples to an N×N×N volume {f(i)} by $B_{P,N}$. The calculation of f(i) (step 38 in FIG. 2) from g (step 34) by formula (5) (step 36) is the "direct", slow method for backprojection.

Figure 3:
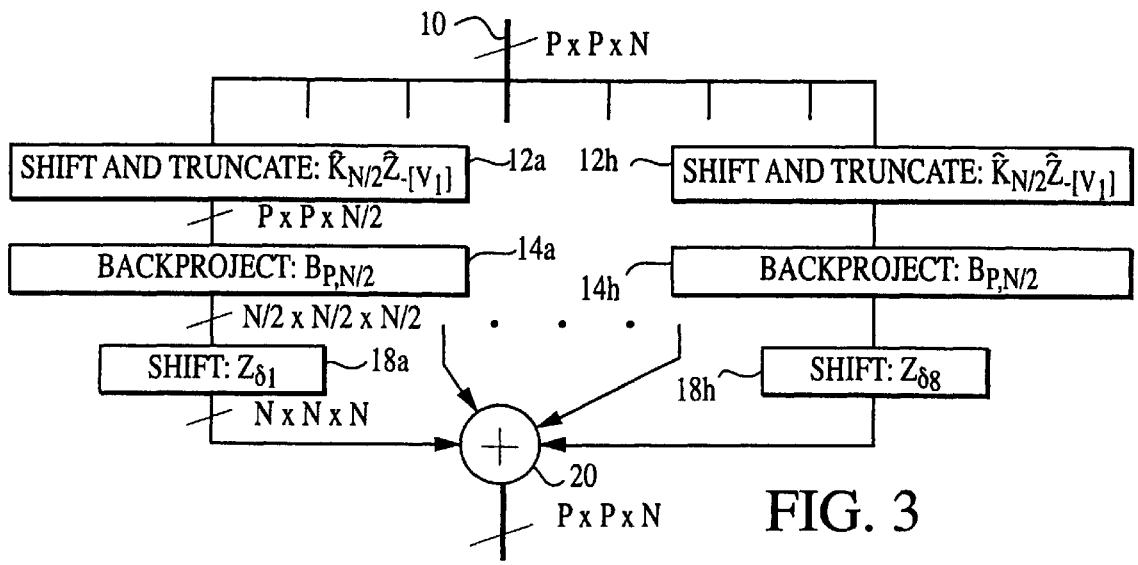
FIG. 3 is a diagram of a decomposition utilizing exact subdivision.

The exact subdivision step is depicted in FIG. 3. The input sinogram (step 10) g(m, n, k) is radially shifted and truncated (step 12a–12h) to yield $g_l$(m, n, k) for l ∈ {1, 2, . . . ,8}, defined by $$g_l(m, n, k) = g\{m, n, k + c_l(m, n)\}, \quad (8)$$

where $$c_l(m, n) = \left[\frac{\delta_l \cdot \omega_{m,n}}{T} + \tau_{m,n}\right] \quad (9)$$

and [x] is the integer nearest x. The $\delta_l$ are defined by $$\delta_1 = [-N/4, -N/4, -N/4]^T \delta_2 = [-N/4, -N/4, N/4]^T \delta_3 = [-N/4, N/4, -N/4]^T \delta_4 = [-N/4, N/4, N/4]^T$$

$$\delta_5 = [N/4, -N/4, -N/4]^T \delta_6 = [N/4, -N/4, N/4]^T \delta_7 = [N/4, N/4, -N/4]^T \delta_8 = [N/4, N/4, N/4]^T. \quad (10)$$

Then $g_l$ is radially truncated to a width of O(N/2) samples. The process of exact subdivision yields $g_l$ that are each P/2×P/2×O(N) in size.

After step 12a–12h, the subsinograms defined by formula (8), one for each octant of the reconstruction, are backprojected $B_{P,N/2}$ (step 14a–14h) via $$f_l(i) = \sum_{m=1}^{P} \sum_{n=1}^{P} \sum_k g_l(m, n, k) \rho\{i \cdot \omega_{m,n} + (k + v_l(m, n))T\}, \quad (11)$$

$$1 \leq i_1, i_2, i_3 \leq N/2$$

where $$v_l(m, n) = \left\langle \frac{\delta_l \cdot \omega_{m,n}}{T} + \tau_{m,n} \right\rangle, \quad (12)$$

and <x>=x−[x]. The aggregation step (steps 18a–18h, 20) consists of simply copying $f_l$ into the lth octant of the final volume.

Figure 4:
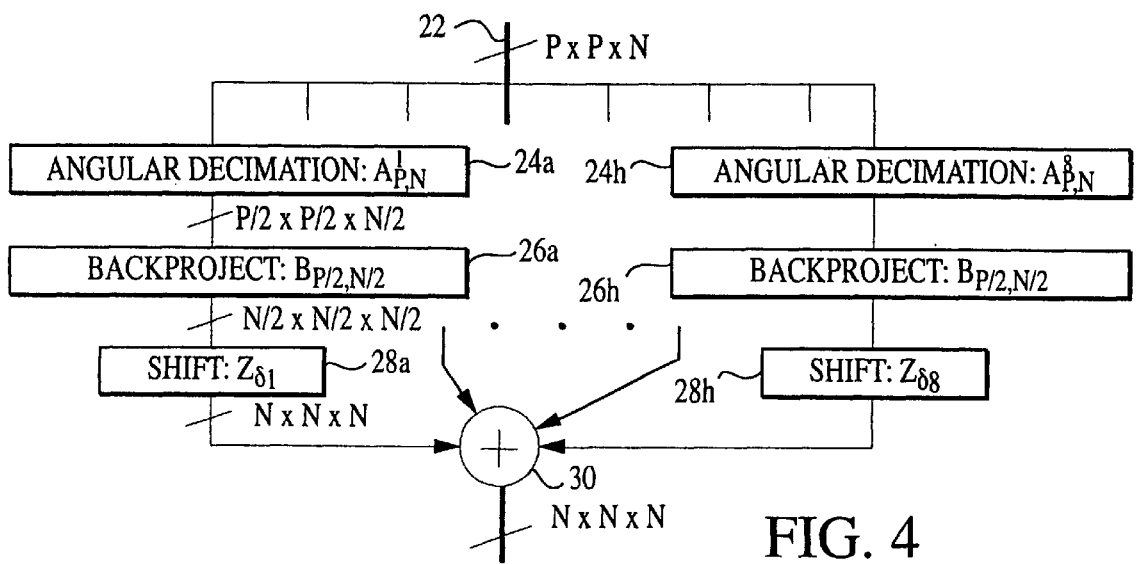
FIG. 4 is a diagram of a decomposition utilizing approximate subdivision.

The approximate subdivision step is depicted in FIG. 4. The input sinogram (step 22), is processed by an "angular decimation step" 24a–24h before backprojection. This angular decimation step 24a–24h contains the approximations made in the approximate decomposition. A comparison between FIGS. 3 and 4 shows that after the processing steps (step 12a–12h and 24a–24h, respectively), the size of the volume being manipulated is different. In the exact decomposition, the output after each of steps 12a–12h is of size P×P×O (N/2), because the processing in formula (8) involves only shifting and truncation in the third coordinate.

For the approximate subdivision, an additional angular smoothing and decimation step is included, so that $g_l$ is now defined by $$g_l(m, n, k) = \sum_u \sum_v \sum_w \alpha(m, n, u, v, w, k) g\{u, v, w + c_l(2m, 2n)\}, \quad (13)$$

where α is an appropriately chosen angular and radial smoothing kernel. In general, α is chosen to have small support and be easily computable so that formula (13) can be calculated very efficiently. The process of the approximate subdivision yields $g_l$ that are each P/2×P/2×O(N/2) in size, as opposed to the exact subdivision, which yields $g_1$ that are each P×P×O (N/2) in size.

After step 24a–24h in FIG. 4, the subsinograms defined by formula (13), one for each octant of the reconstruction, are backprojected $B_{P/2, N/2}$ (step 26a–26h) via $$f_l(i) = \sum_m \sum_n \sum_k g_l(m, n, k) \rho\{i \cdot \omega_{2m,2n} + (k + v_l(2m, 2n))T\}, \quad (14)$$

where v is defined in formula (12). The aggregation step (steps 28a–28h, 30) consists of simply copying $f_l$ into the lth octant of the final volume.

As in the fast 2D backprojection algorithm described in U.S. patent application Ser. No. 09/418,933, the process is applied recursively, with the backprojection steps (step 14a–14h or 26a–26h) being replaced by the entire decomposition, until the outputs are as small as one voxel. By controlling the number of times the exact subdivision process is performed, and the number of times the approximate subdivision process is used, the accuracy of the backprojections can be controlled at the expense of increased computational effort. Furthermore, assuming that α is chosen to have small support, the cost of the proposed process is roughly O ($N^3 \log_2 N$) operations when decomposed to subsinograms that represent single voxels.

A test of the algorithm was performed on the 3D Shepp-Logan head phantom. To use the fast backprojection algorithm for reconstruction, it is first necessary to radially filter the projections with an approximate second-order derivative kernel. The standard second order difference kernel [−1, 0,1] was used for these experiments. Synthetic plane-integral projections were computed for P=256, and the reconstruction volume size was N−256. The detector spacing was set to T−0.5. The filtered data was then backprojected using formula (5), as well as by the proposed process. The data was radially oversampled by a factor of two prior to passing to the fast backprojections. The exact subdivision process was used in the first two stages of the algorithm, with the approximate process being used for the remaining stages. The inventive process was roughly 200 times faster than the direct method, producing reconstructions of comparable quality.

As described, the invention is fairly general, and covers 3D tomographic data acquisition geometries of practical interest. Standard computational techniques can be applied to rearrange the proposed process structure. It can also be implemented in hardware, software, or any combination thereof. However, the defining idea of the hierarchical decomposition and the resulting recursive algorithm structure are not affected by these changes. With varying degrees of computational efficiency, the algorithm can be implemented for another radix or for an arbitrary factorization of N.

The many advantages of this invention are now apparent. Accurate 3D, graphic data can be backprojected more quickly, with less computational cost.

While the principles of the invention have been described above in connection with a specific apparatus and applications, it is to be understood that this description is made only by way of example and not as a limitation on the scope of the invention.

We claim:

1. A process for generating a three-dimensional electronic volume from a sinogram comprising the steps of subdividing the sinogram into a plurality of subsinograms;

backprojecting each of said subsinograms to produce a plurality of corresponding sub-volumes, and aggregating said sub-volumes to create the electronic volume.

2. The method of claim 1 wherein said subdividing step includes performing a number of approximate subdivisions.

3. The method of claim 1 wherein said subdividing step includes performing a number of exact subdivisions.

4. The method of claim 1 wherein said sinogram is subdivided into a plurality of subsinograms in a recursive manner, wherein said subdividing steps include a number of exact subdivisions and a number of approximate subdivisions.

5. The method of claim 1 wherein said aggregation step is performed in a recursive manner.

6. The method of claim 1 wherein said electronic volume is a tomographic volume.

7. The method of claim 1 further comprising preprocessing in which angular and radial oversampling are used to improve the accuracy of the electronic volume.

8. The method of claim 1 wherein said sinograms are subdivided in a recursive manner, until each subsinogram represents a volume of a desired size.

9. The method of claim 8 wherein said subsinograms correspond to volumes as small as one voxel in size.

10. The method of claim 1 wherein the sinogram includes filtered projections.

11. Apparatus for generating a three-dimensional electronic volume of an object comprising:

means for scanning the object to generate data representing a volume of the object;

means for processing said data to generate a sinogram which includes a plurality of filtered projections;

means for subdividing said sinogram into a plurality of subsinograms;

means for backprojecting each of said subsinograms to produce a plurality of corresponding subvolumes;

means for aggregating said subvolumes to create the electronic volume; and means for displaying the electronic volume.

12. The apparatus of claim 11 wherein said means for subdividing performs a number of approximate subdivisions.

13. The apparatus of claim 11 wherein said means for subdividing performs a number of exact subdivisions.

14. The apparatus of claim 11 wherein said sinograms are subdivided into a plurality of subsinograms in a recursive manner, wherein said means for subdividing performs a number of exact subdivisions and a number of approximate subdivisions.

15. The apparatus of claim 11 wherein said means for aggregating operates in a recursive manner.

16. The apparatus of claim 11 wherein said electronic volume is a tomographic volume.

17. The apparatus of claim 11 wherein said means for processing performs angular and radial oversampling to improve the accuracy of the electronic volume.

18. The apparatus of claim 11 wherein said means for subdividing operates in a recursive manner, until each subsinogram represents a volume of a desired size.

19. The apparatus of claim 18 wherein said subsinograms correspond to volumes as small as one voxel in size.

20. The method of claim 2 wherein said approximate subdivision steps include radial truncation and shifting, and angular decimation of the sinogram.

21. The method of claim 3 wherein said exact subdivision steps include radial truncation and shifting.

22. The apparatus of claim 12 wherein said approximate subdivisions include radial truncation and shifting, and angular decimation of the sinogram.

23. The apparatus of claim 13 wherein said exact subdivisions include radial truncation and shifting.

* * * * *

UNITED STATES PATENT AND TRADEMARK OFFICE
CERTIFICATE OF CORRECTION

PATENT NO. : 6,307,911 B1
DATED : October 23, 2001
INVENTOR(S) : Basu et al.

It is certified that error appears in the above-identified patent and that said Letters Patent is hereby corrected as shown below:

Column 3,
Line 56, delete $$\delta_1 = [-N/4,-N/4,-N/4]^T \delta_2 = [-N/4,-N/4,N/4]^T \delta_3 = [-N/4,N/4,-N/4]^T \delta_4 = [-N/4,N/4,N/4]^T$$

$$\delta_5 = [N/4,-N/4,-N/4]^T \delta_6 = [N/4,-N/4,N/4]^T \delta_7 = [N/4,N/4,-N/4]^T \delta_8 = [N/4,N/4,N/4]^T$$

and add
--

$$\delta_1 = [-N/4,-N/4,-N/4]^T \qquad \delta_2 = [-N/4,-N/4,N/4]^T$$
$$\delta_3 = [-N/4,N/4,-N/4]^T \qquad \delta_4 = [-N/4,N/4,N/4]^T$$
$$\delta_5 = [N/4,-N/4,-N/4]^T \qquad \delta_6 = [N/4,-N/4,N/4]^T$$
$$\delta_7 = [N/4,N/4,-N/4]^T \qquad \delta_8 = [N/4,N/4,N/4]^T$$

-- thereto.

Signed and Sealed this

Eleventh Day of June, 2002

Attest:

Attesting Officer

JAMES E. ROGAN
Director of the United States Patent and Trademark Office